I. C. POPPER.
PORTABLE HEATER AND COOKER.
APPLICATION FILED DEC. 16, 1920.
1,437,073.
Patented Nov. 28, 1922.
2 SHEETS—SHEET 2.
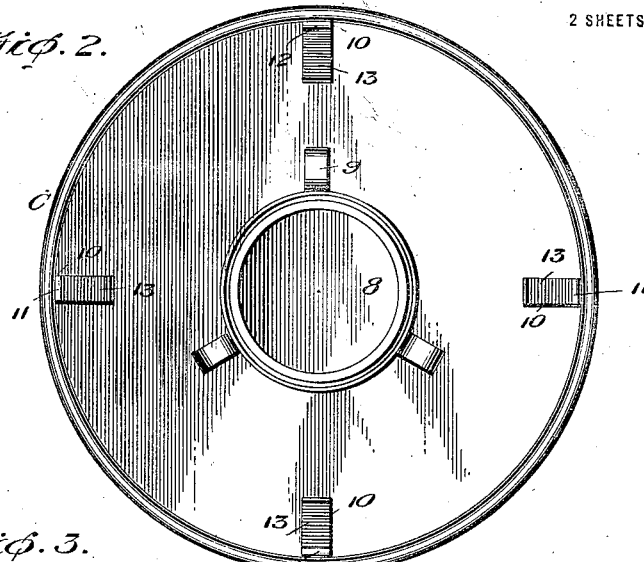
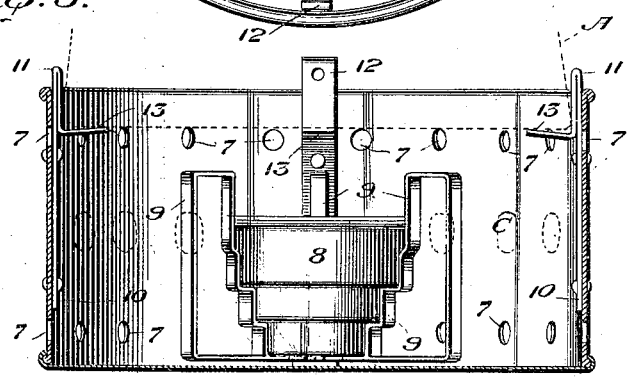
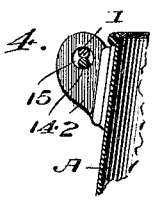
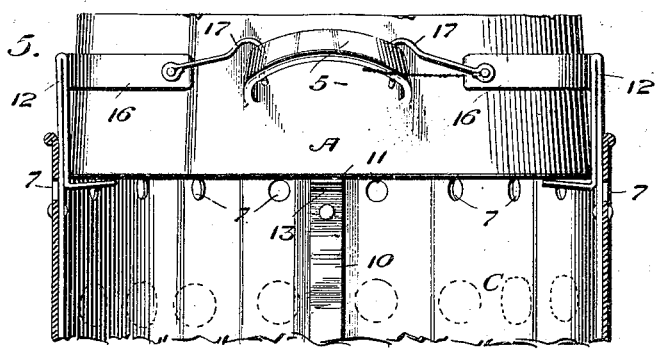

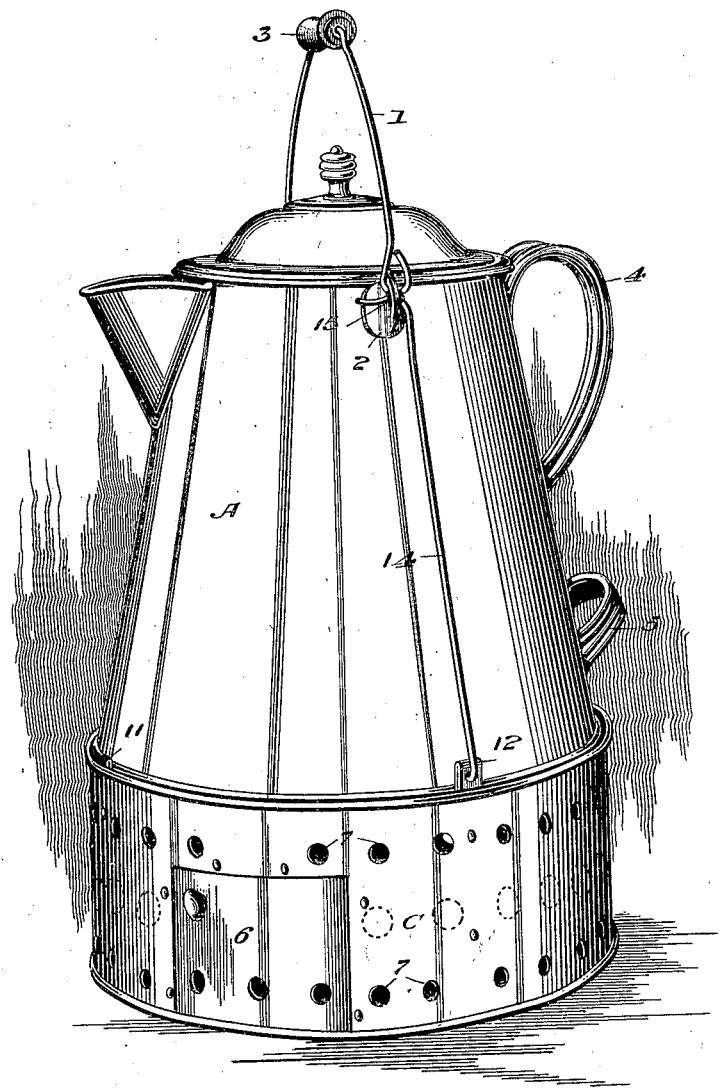

Patented Nov. 28, 1922.

1,437,073

UNITED STATES PATENT OFFICE.

ISAAC C. POPPER, OF NEW YORK, N. Y., ASSIGNOR TO THE THEROZ COMPANY, OF NEW YORK, N. Y., A CORPORATION OF DELAWARE.

PORTABLE HEATER AND COOKER.

Application filed December 16, 1920. Serial No. 431,207.

*To all whom it may concern:*

Be it known that I, ISAAC C. POPPER, a citizen of the United States, residing at New York city, in the county of New York and State of New York, have invented certain new and useful Improvements in Portable Heaters and Cookers, of which the following is a specification.

My invention relates to an improvement in portable heaters and cookers.

The present invention is a detachable heater and cooker, designed to be detachably secured to a coffee-pot or similar portable heating and cooking utensil, there being means provided for detachably suspending the heater and cooker therefrom, while holding it rigidly in place when detached, so that the heat generated is directly applied to the culinary article under proper conditions of fuel and air admixture and combustion.

This invention consists in a combustion chamber having perforations for the admission of air and the escape of the products of combustion, means for holding the fuel in place, and means for detachably securing it to, and suspending it from, the article containing the material to be cooked or heated.

In the accompanying drawings:

Fig. 1 is a view in perspective;

Fig. 2 is a top plan view of the combustion chamber of the heater and cooker;

Fig. 3 is a vertical section of the same;

Fig. 4 is a detail;

Fig. 5 is an alternative form of construction.

A, represents a coffee-pot. This is of any approved construction, and is merely typical of any cooking-utensil in which coffee, tea, chocolate, cocoa, water, or any liquid may be boiled or heated, or in fact of any cooking utensil in which food, such as eggs, sausages, vegetables, etc., might be either cooked or kept hot.

In the particular form shown, there is a coffee-pot, which has the usual bail 1 pivoted to the ears 2 on either side, with a handle 3 thereon, as well as the handles 4 and 5 rigidly secured to the back of the pot for convenience in pouring the contents.

The letter C represents the heater or cooker, which will be termed a combustion-chamber. It is preferably cylindrical, and provided with a door 6 of any approved form, for example hinged or sliding. The entire combustion chamber is provided with rows or perforations 7. They are of a size, and there are as many of these rows as required to support perfect combustion, the size and number being determined by the size of the combustion-chamber, the amount of fuel, and the oxygen necessary to support perfect combustion, some of these perforations being for the intake of air, and the others for the outlet of the products of combustion.

Within the combustion chamber is a burner 8 of any approved type, in the present instance of the staggered form, and containing solidified alcohol as a fuel. This burner is frictionally held in a holder 9 of any approved form, but preferably corresponding to the shape of the burner can 8, the holder being rigidly secured on the bottom of the combustion chamber.

Four supports 10 are equidistantly placed within the combustion chamber, and preferably consist of a narrow strip of metal bent to form upstanding lugs 11 and 12, and rests 13 which project inwardly and slightly upwardly in the top of the combustion chamber. On these rests 13, the coffee-pot or other heating or cooking utensil is supported, while between the upstanding lugs 11 and 12 the combustion chamber is frictionally held tight to the base of the receptacle above, as well as being properly centered, these supports being so arranged and disposed that they have this desired effect of making a tight and rigid fastening between the cooking utensil and the combustion chamber.

In addition to this, however, the hooks 14 are pivoted at their lower ends to the lugs 12 at opposite sides, and the upper ends of these hooks are hooked into the holes 15 of the ears 2 on the opposite sides of the coffee-pot or other utensil, where the usual bail 1 is pivoted as shown in Figs. 1 and 4.

In this way the coffee-pot or boiler A is quickly and easily attached to, or detached from, the combustion-chamber, and when secured together they become in effect one and the same article being carried about together by grasping the handle 3 of the bail 1.

In the form of device illustrated in Fig. 5, the lugs are extended a little higher, and a band 16 is secured thereto, with hooks 17 on the ends to hook into the lower handle 5 of the pot A, thus affording another of several possible alternative methods of attaching the cooking device to the combustion chamber.

I claim:

1. A portable heating and cooking device including a perforated combustion chamber having lugs and rests which project upwardly and horizontally respectively, a receptacle adapted to rest between the lugs and upon the rests, and fastening means connected with the lugs for securing the receptacle to the combustion chamber.

2. A portable heating and cooking device including a perforated combustion chamber having combined upstanding lugs and rests which project upwardly and horizontally respectively, a receptacle adapted to rest between the lugs and upon the rests, and fastening means connected with the lugs for securing the receptacle to the combustion chamber.

In testimony whereof I affix my signature.

ISAAC C. POPPER.